_United States Patent Office_

3,353,147
Patented Nov. 14, 1967

3,353,147
CLOSE-IN TARGET ELECTRONIC
CANCELLATION DEVICE
George W. Meeker, Jr., Silver Spring, Md., assignor to the United States of America as represented by the Secretary of the Navy
Filed Mar. 18, 1966, Ser. No. 536,947
4 Claims. (Cl. 340—3)

The invention described herein may be manufactured and used by or for the Government of the United States of America for governmental purposes without the payment of any royalties thereon or therefor.

This invention relates generally to noise reduction circuits, and more particularly to a close-in target and cross-talk electronic cancellation system useful in continuous transmission frequency modulated sonar systems.

In a continuous transmission frequency modulated sonar system, the frequency of the transmitted energy is linearly varied within a predetermined frequency band over a short period of time. The frequency difference between the transmitted wave and the one received is then a measure of the travel time to a target and back, and hence its range. For a constant range, a constant difference frequency results, providing the operator with continuous target information. Separate transmitting and receiving transducers must be used, with special care taken to minimize direct pickup of the acoustic transmission by the receiving hydrophone since substantial attenuation of cross-talk is needed to insure proper functioning of the heterodyne mixer in the sonar system for the farthest range gate. Considerable attenuation of cross-talk is achieved by judicious placement of transducers in the sea unit. Additional attenuation is provided by baffling the receiving hydrophone at the cost of increased sea unit size and bulk. Still further attenuation, however, is required to permit uncluttered operation of the sonar system out to extreme ranges.

Since unwanted cross-talk may be discriminated from a legitimate target echo on the basis of its frequency separation from the transmitted frequency, effective attenuation of cross-talk might be obtained with an electrical filter. Actual target echoes differ by 500 c.p.s. or more, whereas acoustic cross-talk generally is only a few cycles different corresponding to the acoustic delay in water for the transmitted energy to reach the receiving hydrophone. Thus, a filter would be required such that frequencies less than 500 c.p.s. different from the transmitted frequency are attenuated whereas those greater are unaffected. The filter must be located prior to the heterodyne mixer, since it is there that the cross-talk cannot be tolerated. Specifically, then, the requirement is for a notch filter, centered at the transmitter frequency, of bandwidth not to appreciably attenuate frequencies on either side but providing considerable reduction near the center. Actually, the 500 c.p.s. requirement is on the upper side only, since actual target echoes are slightly above or considerably below the transmitted frequency. The variable center frequency of the notch filter makes the design of a passive filter awkward. Inductors or capacitors would have to be variable and made to track the transmitter frequency rather closely. Furthermore, the equivalent resonant Q of the filter must be well over 100.

It is therefore an object of the instant invention to provide within a continuous transmission frequency modulated sonar system a device for the reduction of cross-talk thereby permitting uncluttered operation of the sonar system out to ranges unobtainable without the device.

It is another object of this invention to provide an electronic cross-talk cancelling circuit useful in extending the range of sonar systems.

It is a further object of the invention to provide an electronic notch filter having a variable center frequency.

According to the present invention, the foregoing and other objects are attained by providing an active filter prior to the heterodyne mixer in a sonar receiver which comprises a feedback loop having an electronic band pass filter the output of which is only the offending cross-talk. The output is amplified, inverted, and added with the input target echoes plus cross-talk. The inverted cross-talk thus tends to buck out or cancel the cross-talk in the input signal.

The specific nature of the invention, as well as other objects, aspects, uses and advantages thereof, will clearly appear from the following description and from the accompanying drawings, in which.

Figure 1:
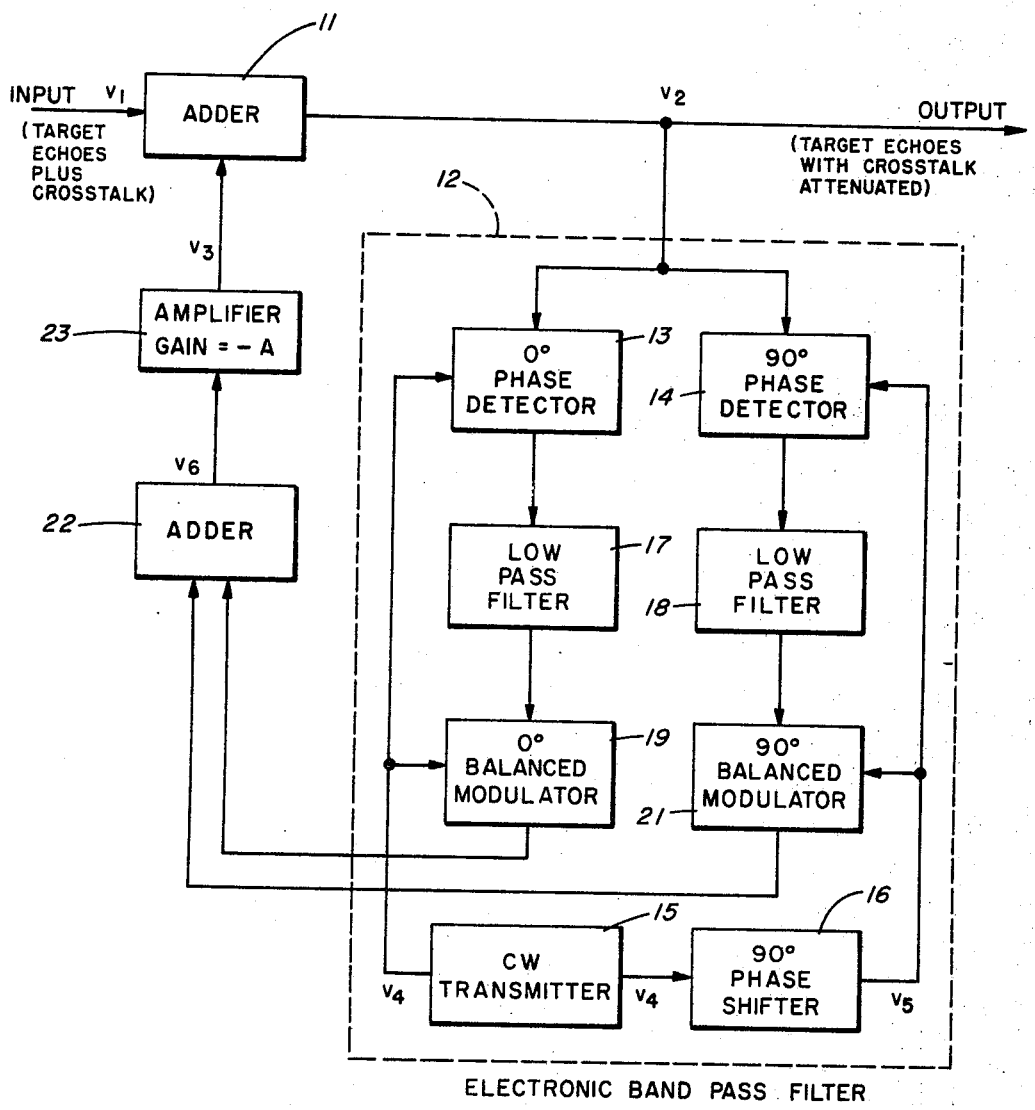
FIG. 1 is a block diagram of the electronic cross-talk cancellation circuit according to the invention.

Referring now to the drawing wherein like reference numerals designate identical or corresponding parts throughout the several figures, and more particularly to FIG. 1 the input signal which includes target echoes plus cross-talk and designated $v_1$ is applied to one of the inputs of adder circuit 11. The output of adder circuit 11 which is designated $v_2$ is fed to the heterodyne mixer of the sonar receiver (not shown) and to electronic band pass filter 12. Band pass filter 12 comprises two phase detectors 13 and 14 each of which receives as its signal input the signal $v_2$. Phase detectors 13 and 14 are balanced demodulators operating in phase quadrature. This is accomplished by applying the carrier voltage, designated here as $v_4$, generated by CW transmitter 15 to phase detector 13. The carrier voltage $v_4$ is also applied to 90° phase shifter circuit 16 which produces an output voltage $v_5$ which is identical to voltage $v_4$ but shifted or delayed in phase by 90°. The voltage $v_5$ is supplied to phase detector 14. The phase detected output signals from phase detectors 13 and 14 are filtered by low pass filters 17 and 18, respectively. The filtered signals are then supplied as the signal inputs to balanced modulators 19 and 21, respectively. Balanced modulators 19 and 21, like phase detectors 13 and 14, operate in phase quadrature, carrier voltage $v_4$ being applied to modulator 19 and 90° phase shifted carrier voltage $v_5$ being applied to modulator 21. The outputs of modulators 19 and 21 are combined in adder circuit 22 to produce a combined signal designated as $v_6$. Signal $v_6$ is then inverted and amplified with a gain equal to $-A$ by amplifier 23 to produce a signal designated as $v_3$ which is applied as the second input to adder circuit 11. The resulting system gain for cross-talk frequencies (i.e. $v_2/v_1$) is equal to $1/(1+A)$ and the gain for other frequencies representing legitimate target echoes is equal to 1.

The active bandpass filter 12 treats the output signal $v_2$ as phase modulation of the transmitter CW voltage $v_4$ and phase detects it in the two balanced detectors 13 and 14 operating in phase quadrature. Any frequency close to voltage $v_4$ is seen as the same frequency whose phase is varying at a slow rate. This slow rate of change passes through the low pass filters 17 and 18. This rate of change is actually the frequency difference between $v_2$ and $v_4$:

$$f_\text{diff} = \frac{1}{2\pi} \cdot \frac{d\phi}{dt} = f_{v_2} - f_{v_4}$$

Any frequency considerably apart from voltage $v_4$ is treated as $v_4$ with a rapid rate of phase change. This is a correspondingly high difference frequency which is highly attenuated in low pass filters 17 and 18. The two balanced modulators 19 and 21 which follow low pass filters 17 and 18 provide quadrature components of voltage $v_4$ in proportion to the phase detected components of signal $v_2$. The resulting combined signal $v_6$ will be equal in amplitude to output signal $v_2$ if $v_2$ is close in frequency to carrier voltage $v_4$; however, if the frequency separation between output signal $v_2$ and carrier voltage $v_4$ is great, signal $v_6$ will have much less amplitude than $v_2$.

Figure 2:
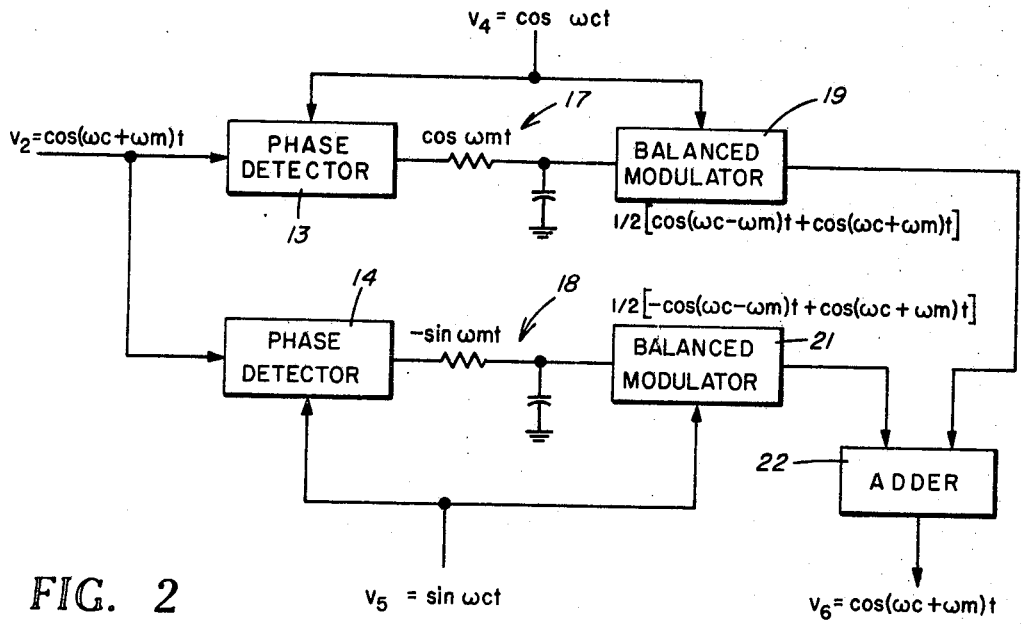
FIG. 2 is a simplified block diagram illustrating the operation of the electronic band pass filter for a cross-talk frequency higher than the transmitted frequency.
Figure 3:
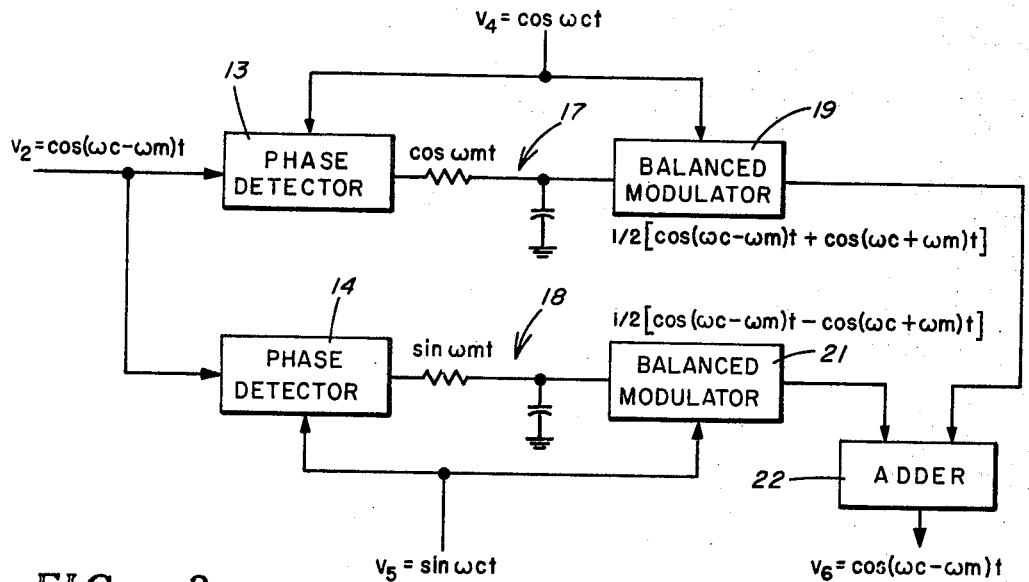
FIG. 3 is a simplified block diagram illustrating the operation of the electronic band pass filter for a cross-talk frequency lower than the transmitted frequency.

A mathematical analysis of the operation of band pass filter 12 may be had by referring to FIGS. 2 and 3. Consider first FIG. 2 in which the cross-talk frequency is assumed to be higher than the transmitter frequency. Output signal $v_2$ is then equal to $\cos(\omega_c+\omega_m)t$, where $\omega_c$ is the angular frequency of the carrier voltage and $\omega_m$ is the angular frequency of the modulating voltage. The output of phase detector 13 is then $\cos \omega_m t$, while the output of phase detector 14 is $-\sin \omega_m t$. If $\omega_m$, which is proportional to the frequency difference between signal $v_2$ and carrier voltage $v_4$, is large corresponding to a distant target echo, the outputs of phase detectors 13 and 14 are substantially attenuated by low pass filters 17 and 18, respectively. If on the other hand $\omega_m$ is small corresponding to undesirable cross-talk, the outputs of phase detectors 13 and 14 are passed substantially unaffected to balanced modulators 19 and 21, respectively. In this case balanced modulator 19 produces an output signal equal to $$\tfrac{1}{2}[\cos(\omega_c-\omega_m)t+\cos(\omega_c+\omega_m)t]$$

and balanced modulator 21 produces an output signal equal to $$\tfrac{1}{2}[-\cos(\omega_c-\omega_m)t+\cos(\omega_c+\omega_m)t]$$

The two signals when combined in adder circuit 22 produce signal $v_6$ which is equal to $\cos(\omega_c+\omega_m)t$. This of course is equal to signal $v_2$ and when inverted and then combined with input signal $v_1$ in adder circuit 11 acts to buck out or cancel the cross-talk. A similar analysis pertains to the case where the cross-talk frequency is lower than the transmitted frequency and is particularly illustrated in FIG. 3.

The details of the low pass filters deserve some note. Since the invention is a closed loop feedback system, the possibility of instability exists. To preclude this, the frequency roll-off should be less than 12 db/octave. This is sufficient to prevent the cumulative phase shift around the closed loop from approaching 180° and producing regenerative feedback. Filters 17 and 18 as illustrated in FIGS. 2 and 3 are simple minimum phase RC filters which provide 6 db/octave roll-off.

Various modifications and other applications of the invention are contemplated and may obviously be resorted to by those skilled in the art without departing from the spirit and scope of the invention, as hereinafter defined by the appended claims, as only a preferred embodiment thereof has been disclosed. For example, a variable frequency band pass filter may be obtained by replacing the low pass filters 17 and 18 with high pass filters. Effectively a band pass filter at some constant frequency to either side of the transmitter frequency may also be realized by placing a tuned circuit between the phase detectors 13 and 14 and balanced modulators 19 and 21. In general, the approach to filtering of this invention is useful for obtaining several types of narrow band select or reject filters whose center frequency must vary in step with a master frequency.

I claim as my invention:

1. An electronic notch filter having a variable center frequency, comprising:
   an adder circuit receiving as one input the signal to be filtered and providing a filtered output signal, and
   an electronic band pass filter the center frequency of which varies in step with a master frequency, the output of said adder circuit being connected to the input of said electronic band pass filter and the output of said electronic band pass filter being connected to a second input of said adder circuit.

2. An electronic notch filter as recited in claim 1 wherein said electronic band pass filter comprises;
   first and second balanced phase detectors operating in quadrature with said master frequency, the output of said adder circuit being connected to both said first and second balanced phase detectors,
   first and second passive filters connected to the outputs of said first and second balanced phase detectors, respectively,
   first and second balanced modulators operating in quadrature with said master frequency, said first balanced modulator being connected to said first filter and synchronized with said first balanced phase detector and said second balanced modulator being connected to said second filter and synchronized with said second balanced phase detector, and
   means connected to said first and second balanced modulators for combining and inverting the outputs thereof and supplying the resultant signal to said second input of said adder circuit.

3. An electronic notch filter as recited in claim 2 wherein said first and second filters are low pass filters.

4. In a continuous transmission frequency modulated sonar system having a transmitter and a receiver,
   an electronic notch filter as recited in claim 3 connected prior to the heterodyne mixer in said receiver and wherein said master frequency is derived from said transmitter.

References Cited

UNITED STATES PATENTS

| 3,187,330 | 6/1965 | Boles et al. | 343—14 X |
| 3,241,077 | 3/1966 | Smyth et al. | 328—165 |
| 3,308,389 | 3/1967 | Toman et al. | 328—167 |

RODNEY D. BENNETT, *Primary Examiner.*

R. A. FARLEY, *Assistant Examiner.*